United States Patent [19]

Müller et al.

[11] 4,182,482

[45] Jan. 8, 1980

[54] METHOD AND MECHANISM FOR CODE SENSING

[75] Inventors: Wolfgang W. Müller, Friedberg; Hans H. Dobberstein, Rockenberg; Erwin Schröder, Butzbach, all of Fed. Rep. of Germany

[73] Assignee: Bell and Howell Company, Chicago, Ill.

[21] Appl. No.: 529,383

[22] Filed: Dec. 4, 1974

[30] Foreign Application Priority Data

Dec. 5, 1973 [DE] Fed. Rep. of Germany ....... 2360664

[51] Int. Cl.² .......................... G06K 7/14; G08C 9/06; G06K 7/016; G06K 19/06
[52] U.S. Cl. ..................................... 235/454; 250/566; 235/474; 235/487
[58] Field of Search ................. 235/61.11 E, 61.11 R, 235/61.7 B, 454, 458, 459, 462; 250/555, 566, 568, 569

[56] References Cited

U.S. PATENT DOCUMENTS

| | | | |
|---|---|---|---|
| 3,576,430 | 4/1971 | Fickenscher | 235/61.11 E |
| 3,586,833 | 6/1971 | Schafer | 235/61.11 E |
| 3,627,990 | 12/1971 | Sallach | 235/61.11 E |
| 3,858,032 | 12/1974 | Scantlin | 235/61.11 R |

*Primary Examiner*—Daryl W. Cook
*Attorney, Agent, or Firm*—Griffin, Branigan & Butler

[57] ABSTRACT

An automatic envelope stuffing by code reading improvement having code-reading, fiber-optic bundle ends equally spaced longitudinally along a read head, separated the same distance as code marks carried on the paper to be stuffed are separated. Located past those code-reading elements are two control-reading, fiber-optic bundles spaced longitudinally, but relatively close together. A light-source, fiber-optic bundle is located beside each reading bundle. The paper is moved longitudinally, and the apparatus responds to the first mark sensed by the first control-reading elements to read from all of the code-reading elements in parallel, and then to terminate that reading in response to the sensing of the first mark by the second control-reading element. Error from dirt and extraneous marks on the paper is greatly reduced.

27 Claims, 7 Drawing Figures

FIG. 5
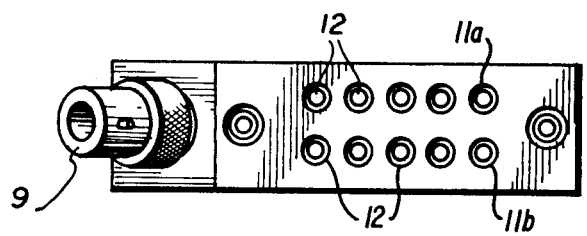
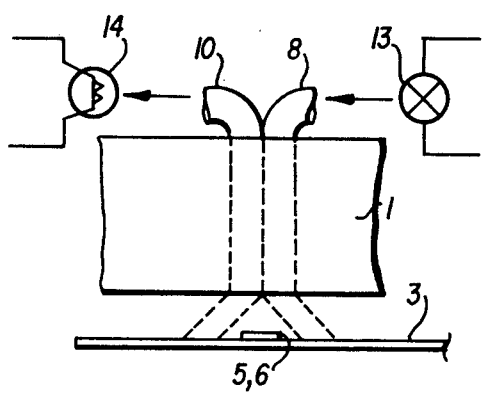
FIG. 6
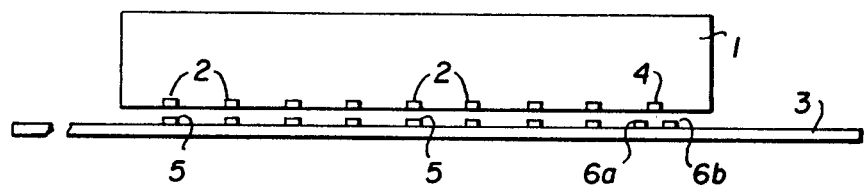
FIG. 7

METHOD AND MECHANISM FOR CODE SENSING

BACKGROUND OF THE INVENTION

The invention concerns a method and a mechanism for sensing of marks which are placed on a record carrier.

Many applications are current in which information recorded onto a record carrier must be sensed in order to control certain processes as a function of the read information. For instance, the operation of an envelope-stuffing machine is controlled by the information contained on the sheets to be inserted. This information contains for instance data about the number and type of sheets to be inserted together, data as to filing certain mail envelopes not into a common storage container but into a specific storage container, data about the type of the envelope to be chosen, and other pertinent data.

In the example of the envelop-stuffing machine, the sheet carrying the information passes a read-out head which senses the information for use. The information on the paper is in the form of marks which may be, for example, imprinted or cut out of the material. Usually, the information is arranged in binary form and combined in information blocks or groups which each have a pre-determined number of bits. A proper operation of the machine, however, is only achieved by this automatic information read-out when the information to be observed is being sensed error-free. Operation is not problem-free since many error sources exist, especially since every visual writing or dirt deposition in the region of the read-out head potentially leads to an error in the optical scanning.

The invention is in response to that problem. It provides a method and a system with which an erroneous reproduction of the information to be sensed is largely eliminated.

The method on which the invention is based pre-supposes that, by utilizing a control mark associated with the individual groups of information to be sensed, practically all erroneous information, outside the region of information to be sensed, can be rejected. Accordingly, not all information which the read-out head encounters while scanning the record carrier is connected to the processing unit associated with the read-out head, but only the real information to be scanned and processed.

Along these lines, a similar proposal has been made, that is to use the page margin of the record carrier as control mark and to only transmit information of that region of the record carrier where the information to be scanned is to be expected. But, relatively large anticipated printing tolerances must be considered with such a system so that the area in which the information is to be expected must be designed to be relatively large. In that way, all erroneous information in that area is scanned too and accordingly leads again to control errors.

The method according to this invention, on the other hand, places the control marks in a specific, spatial relationship to the marks carrying information as such and to be scanned, so that the region scanned by the read-out head is limited only to the area carrying the useful information.

SUMMARY OF THE INVENTION

This problem is solved, according to the invention, in that the record carrier is moved relative to a read-out head and the record comprises read-input control marks which are provided at a distance from the other marks of the record carrier. The information marks on the record carrier are arranged in groups and are read in parallel temporarily by the individual reading inputs on the read head. A control mark is associated with each group of marks, two control-mark sensing elements are provided in the read-out head, arranged in back of one another in the direction of motion and separated from the other reading inputs. A scanning of the marks is effected by the reading inputs when the control mark is in the area between the control mark reading inputs, and the information sensed is transmitted to an information processing system. The sensing is only conducted when the control mark is in the area between the mark read-out inputs.

Starting with a system employing a record carrier movable relative to a read-out head, on which single marks are sequentially positioned, and also with an information processing system connected with the read head, an advantageous system for executing this invention comprises a read head provided with a number of sensing elements which are arranged at separations equal to separations of the marks to be scanned. In addition to sensing elements for code marks, two sensing elements are provided positioned in the direction of movement and adjacent to one another; these elements respond to a control mark. The number of code-mark reading elements equals the number of code marks and a control mark is associated with each group of code marks. The control mark reading elements are connected to a control system so that the reading head is only connected to the information processing system during those times when the control mark is in the area between the two control mark read elements.

A further advantageous feature of the system described is realized from the separation of the control-mark sensing elements being smaller than the separation of the markings on the record. The separation of the control-mark sensing elements determines the width of the area scanned on the record carrier by each code mark sensing element in the direction of motion. Since the control marks as well as the code marks holding the information per se can be placed on the record carrier with relatively close tolerances, the separation of the control-mark sensing elements can be made substantially smaller than the separation of the markings on the record carrier. As a result, the record carrier is scanned practically only in the region of markings placed thereon. By such concentration of area observed, it is possible to blank out space between markings, where erroneous information might be sensed and lead to errors.

Other advantages are realized by forming the reading sensor of glass fiber bundles since glass fiber bundles are very well suited for transmittal of optical information. In is furthermore advantageous if each glass fiber bundle of a sensing element is associated with another glass fiber bundle. These two associated glass fiber bundles are positioned immediately adjacent to one another at the reading input, and light for illuminating the mark to be scanned is transmitted via this other glass fiber bundle. The illumination of the markings to be scanned is accomplished in this embodiment directly by the read-out head and not by a light source outside the read-out head. This has the advantage that the read head can be placed very close to the record carrier, yielding a relatively high resolution. However, a certain separation between read head and record carrier is still required in order to achieve an overlap between illuminated and scanned areas. By separately illuminating each individual mark by a specifically provided glass fiber bundle, the advantage of directly illuminating the area scanned is obtained. This is an improvement independent of other aspects of the full invention described.

It is also advantageous in this connection if all additional glass fiber bundles, serving to illuminate the markings, are fed by a common light source. It is merely necessary to combine the ends of the supplementary glass fiber bundles at the common light source. This has the advantage that the illumination of the individual reading input areas does not have to be individually checked, but it is sufficient to check the functioning of only the single, common light source.

The described method as well as the described system are especially advantageous in the field of mail inserting machines (envelope-stuffing). As mentioned above, the sheets of paper to be inserted into envelopes carry the information for controlling the machine. Since the marks are printed at relatively close separations and the position of the information carrier in the machine cannot be very precise, a high occurrence of errors in the information sensing would be the case without the proposals indicated. Such error is are largely eliminated by means of method and system according to this invention.

The invention is further described by the following example embodiment, as illustrated by the accompanying drawings.

BRIEF DESCRIPTION OF THE DRAWING

FIGS. 3 through 5 show different views of a reading head according to the invention.

FIG. 6 shows a schematic view for clarifying the mode of operation of a reading head.

FIG. 7 is a fragmented view similar to FIGS. 1 and 2, but of a modified embodiment.

DESCRIPTION OF THE PREFERRED EMBODIMENTS

Figure 1:
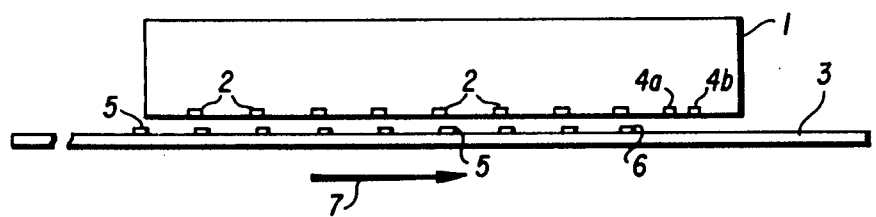
FIGS. 1 and 2 show a reading head schematically with its associated record carrier at different phases of movement.

The read head 1 shown in the drawings contains eight adjacently arranged read-out inputs 2 which serve to scan information recorded on record carriers. In addition to these code sensing elements 2 the reading head 1 contains two control-mark sensing elements 4a and 4b, whose function is explained below.

Figure 2:
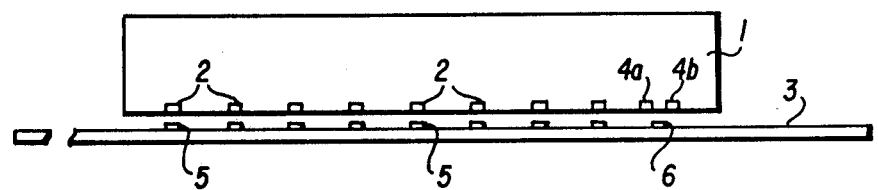

Corresponding to the eight sensing inputs 2 in read-out head 1 eight markings 5 and an additional control mark 6, are drawn on the record carrier 3 as shown in FIGS. 1 and 2. All markings 5 and 6 on the record carrier 3 are equally spaced. The read-out inputs 2 in the reading head 1 are spaced identically to those of marks 5 on the record carrier, so that the markings 5 can be read by the reading inputs temporarily in parallel. The markings 5 drawn on the record carrier 3 represent merely positions for information to be carried, for instance by printing onto or perforating the record carrier. Since the absence of a mark can represent an information of a certain kind as well, the mark 5 does not have to be different from its immediate surround. The control mark 6, however, is always different from its immediate surround.

In the illustrated example, the control mark 6 has the same separation from its adjacent mark 5 as the marks 5 among each other. While the separation of the reading inputs 2 is equal to that of the marks 5, the separation of the control-mark reading inputs 4a and 4b is substantially smaller. The center line between the two control-mark reading inputs 4a and 4b, however, is separated from the adjacent reading input 2 just as much as the control mark 6 is separated from its adjacent mark 5.

The following describes the method with which the information, recorded on the record carrier 3, is scanned in more detail.

The record carrier 3 is moved, when the reading head 1 is stationary, below its sensing heads 2 in the direction of the arrow 7 shown in FIG. 1 and at a pre-determined speed. During this moving phase, illustrated in FIG. 1, the information inputs of the read head 1 are cut off from an information processing system otherwise in connection with the reading head. Thus, scanned information sensed via the sensing elements is not transmitted to the information processing system. When, during further movement of the record carrier 3, the control mark 6 reaches the scanning area of the control-mark sensing element 4a, it renders an output signal which effects the connection of all reading inputs 2 with the information processing system, so that the information now sensed by reading inputs 2, can reach the information processing system. When, as shown in FIG. 2, the record carrier 3 moves to the position where all marks 5 on the record carrier 3 lie at the sensing elements 2, the information contained in the marks 5 is transmitted temporarily in parallel to the information processing system.

When the record carrier 3 is moved farther, the control mark 6 passes the next control mark reading input 4b, which causes the outputs of the sensing elements 2 to again be disconnected from the information processing system. The marks 5, passing the reading inputs 2, as well as information contained in regions on the record carrier beyond these marks, for instance a title, do not lead to any more information transmitted since, by means of a system not further described here, it is ensured that another scanning accumulation process of the information processing system does not occur within one scanning cycle.

By means of the control mark 6, which is associated with this group of eight marks, it is therefore assured that the individual sensing elements 2 of the reading head 1 transmit only that information to the information processing system which is read from their associated marks 5. When the separation of the control-mark sensing inputs 4a and 4b is narrow, even noise information between two marks 5 on the record carrier 3 does not cause errors, since it is filtered out by the action of the control-mark sensing elements 4a and 4b.

Figure 3:
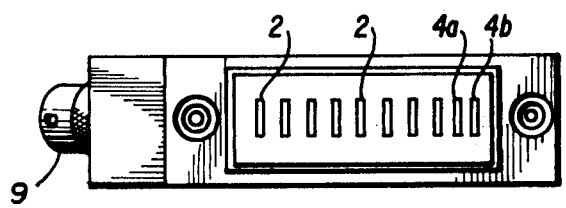
Figure 4:
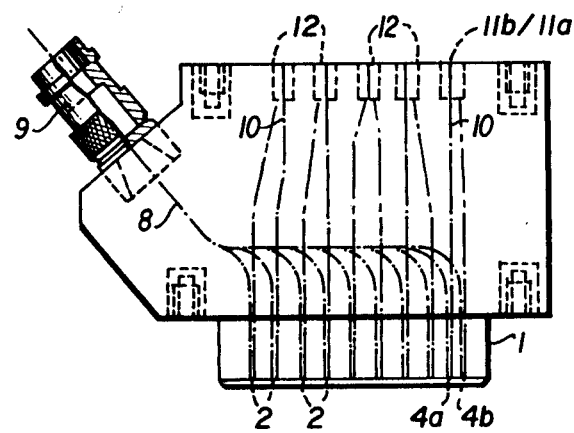

FIGS. 3 to 5 show a reading head in different views. The bottom view shown in FIG. 3 shows the code-mark sensing elements 2 and the control-mark sensing elements 4a and 4b. These reading inputs 2, 4a and 4b are formed by the ends of light guides with which the scanned light information are transmitted to photo-sensitive elements, for instance photo-transistors. Directly adjacent to these reading inputs 2, 4a, 4b are additional ends of light guides 8 which serve to illuminate the scanning areas of the individual reading inputs 2, 4a, b. As can be seen in the side view from FIG. 4, the light guides 8 which serve to illuminate the scanning areas, are combined with their outputs to a plug-portion 9 so that for illuminating all scanning areas only one single light source, not further shown, is required. The individual light guides 10 which lead to the reading inputs 2 and the control mark reading inputs 4a and 4b are lead out in two rows of five outputs each above the reading inputs, the first two exits being those of the control reading inputs 4a and 4b. These control exits are indicated in FIG. 5 from the top view as 11a and 11b, while the other exits, associated with the reading inputs 2, scanning the information as such, are indicated by the reference number 12.

FIG. 6 shows, schematically, the function of the reading head 1 via a light guide 8, illuminating the scanning area, as well as the associated light guide 10, serving to transmit the information. By means of a light source 13, the scanning area on the record carrier is illuminated by the light guide 8. The light reflected off the record carrier 3 is transmitted by the light guide 10 to a light sensitive element 14, for instance a photo-transistor, whose outputs, possible via further electrical circuits, are connected to the information processing system described.

The invention is not limited to the example given. In particular, variations are possible where the control marks on the record carrier, and hence the two control-mark reading inputs, have a different separation from the other mark or reading inputs than the mark or reading inputs among one another. Furthermore, it can be conceived to use two control marks 6a and 6b instead of one control mark and only one control-mark sensing element 4 instead of two as is depicted in FIG. 7. The first control mark 6b, passing this single control-mark reading input, could then connect the other reading elements to the information processing system, while the passing of the second control mark 6a, serves to disconnect them again.

What is claimed is:

1. A process for reading marks arranged on a line on a record carrier with a mark-reading head having at least three mark-sensing elements spaced on a line comprising relatively moving said head and said record carrier with said line of marks moving generally parallel along said line of sensing elements and simultaneously reading the information sensed by a plurality of said elements after one of said elements senses a control mark, said one element being located in the path of said movement to sense said control mark which has passed said plurality of elements during said movement.

2. The process as in claim 1 wherein there are at least four mark-sensing elements and wherein said process also comprises terminating said simultaneous reading in response to the sensing of said control mark sensed by said one sensing element by a second sensing element located on the path of said movement to sense said control mark after it is sensed by said one element.

3. The process as in claim 1 wherein there are at least four marks and wherein said process also comprises terminating said simultaneous reading in response to the sensing of a second mark by said one sensing element.

4. Apparatus for reading code marks arranged on a record carrier comprising a plurality of mark sensing elements spaced from one another, an adjoining two of said elements being substantially closer together than the spacing between other adjoining ones of said elements, said adjoining two closer elements defining a line parallel to which said record carrier and said plurality of mark sensing elements move relative to one another, a control mark of said code marks passing immediately adjacent to said two closer elements, with the others of said elements having an arrangement corresponding to an arrangement of the others of said code marks, with complementary ones of said other code marks and said other elements being approximately adjacent one another when said control mark is between said adjoining two close elements, the mark-sensing elements comprising end portions of optical fibers.

5. The apparatus as in claim 4 in which said sensing elements are located substantially on a straight line.

6. The apparatus as in claim 5 also comprising second optical fibers associated with each said sensing element, with first ends of said second optical fibers being positioned to direct radiation from each said second optical fiber onto the area sensed by the associated sensing element.

7. The apparatus as in claim 6 in which all said second optical fibers to direct radiation have second ends which are positioned to receive said radiation from a common radiation source.

8. The apparatus as in claim 4 also comprising second optical fibers associated with each said sensing element, with first ends of said second optical fibers being positioned to direct radiation from each said second optical fiber onto the area sensed by the associated sensing element.

9. The apparatus as in claim 8 in which all said second optical fibers to direct radiation have second ends which are positioned to receive said radiation from a common radiation source.

10. Apparatus for reading code marks arranged on a record carrier comprising a plurality of mark-sensing elements spaced from one another, an adjoining two of said elements being substantially closer together than the spacing between other adjoining ones of said elements, and means to move the mark-carrying area of a record carrier linearly past said other adjoining elements and then past said two elements so that a control mark of said code marks passes immediately adjacent to said two closer elements, with the others of said elements having an arrangement corresponding to an arrangement of the others of said code marks, with complementary ones of said other code marks and said other elements being approximately adjacent one another when said control mark is between said adjoining two close elements.

11. The apparatus as in claim 10 in which said sensing elements are located substantially on a straight line.

12. The apparatus as in claim 11 in which said mark sensing elements are comprised of end portions of optical fibers which are adapted to receive optical signals.

13. The apparatus as in claim 12 also comprising second optical fibers associated with each said sensing element and positioned to direct radiation from each said second optical fibers onto the area sensed by the associated sensing element.

14. The apparatus as in claim 11 in which said other sensing elements are equally spaced and the center of said two closer elements is substantially the same space from the adjoining one of said other elements as the spacing between said other elements.

15. Apparatus for reading a line of code marks on a record carrier comprising at least four mark-sensing elements spaced from one another substantially on a straight line when said line of four mark-sensing elements is relatively moved parallel to said line of code marks, said apparatus comprising: a means responsive to the sensing of a control mark by one of said elements located between an adjacent upstream and an adjacent downstream element to simultaneously commence a read-out of information sensed by others of said elements, but not said adjacent upstream element, and means responsive to the sensing of said control mark by said adjacent upstream element to terminate said read-out.

16. The apparatus as in claim 15 in which said one element and said adjacent upstream element are substantially closer together than the spacing between said other elements.

17. The apparatus as in claim 16 in which said others of said sensing elements are equally spaced and the midpoint between said one element and said adjacent upstream element is substantially the same space from the adjoining ones of said other elements as the spacing between said other elements.

18. The apparatus as in claim 15 also comprising means to move the mark carrying area of said record carrier in a straight line past said other elements and then past said one element and then past said adjacent upstream element.

19. The apparatus as in claim 18 in which said one element and said adjacent upstream element are substantially closer together than the spacing between said other elements.

20. The apparatus as in claim 19 in which said mark sensing elements are comprised of the end portions of optical fibers adapted to receive optical signals.

21. The apparatus as in claim 20 also comprising second optical fibers associated with each said sensing elements and positioned to direct radiation from each said second optical fibers onto the area sensed by the associated sensing element.

22. The apparatus as in claim 21 in which said other sensing elements are equally spaced and the midpoint between said one element and said adjacent upstream element is substantially the same space from the adjoining one of said other elements as the spacing between said other elements.

23. The apparatus as in claim 22 in which all said second fibers to direct radiation are positioned to receive said radiation from a common radiation source.

24. Apparatus for reading code marks on a record carrier comprising a plurality of mark-sensing elements spaced from one another, means to move a mark-carrying area of said record carrier linearly past at least two of said elements and then past another of said elements, means responsive to the sensing of a mark by said another element to simultaneously read-out information sensed by others of said elements, and means responsive to the sensing of a second mark by said another element to terminate said read-out.

25. The apparatus as in claim 24 in which said sensing elements are comprised of end portions of optical fibers with the ends adapted to receive optical signals.

26. The apparatus as in claim 25 also comprising second optical fibers associated with each said sensing elements and positioned to direct radiation from each said second optical fibers onto the area sensed by the associated sensing element.

27. The apparatus as in claim 24 in which said sensing elements are located substantially on a straight line.

* * * * *